United States Patent
Alenezi

(10) Patent No.: US 12,499,781 B1
(45) Date of Patent: Dec. 16, 2025

(54) LEFT VENTRICLE IMAGING PHANTOM

(71) Applicant: KUWAIT UNIVERSITY, Safat (KW)

(72) Inventor: Ahmad Tawfiq Alenezi, Safat (KW)

(73) Assignee: KUWAIT UNIVERSITY, Safat (KW)

( * ) Notice: Subject to any disclaimer, the term of this patent is extended or adjusted under 35 U.S.C. 154(b) by 0 days.

(21) Appl. No.: 19/247,453

(22) Filed: Jun. 24, 2025

(51) Int. Cl.
*G09B 23/30* (2006.01)
*G09B 23/32* (2006.01)

(52) U.S. Cl.
CPC ........... *G09B 23/303* (2013.01); *G09B 23/32* (2013.01)

(58) Field of Classification Search
CPC ...... G09B 23/28; G09B 23/286; G09B 23/30; G09B 23/303; G09B 23/32
See application file for complete search history.

(56) References Cited

U.S. PATENT DOCUMENTS

| | | | |
|---|---|---|---|
| 4,894,013 A | 1/1990 | Smith et al. | |
| 4,974,461 A * | 12/1990 | Smith | G09B 23/286 73/865.6 |
| 6,205,871 B1 * | 3/2001 | Saloner | G09B 23/28 600/416 |
| 6,498,828 B2 | 12/2002 | Jiang et al. | |
| 6,629,469 B2 | 10/2003 | Jaszczak et al. | |
| 6,843,145 B2 * | 1/2005 | Jaszczak | G01R 33/58 600/416 |
| 8,535,061 B2 | 9/2013 | Boutchko et al. | |
| 8,608,484 B2 * | 12/2013 | Kalafut | G09B 23/32 600/419 |
| 8,920,176 B1 * | 12/2014 | Yang | G09B 23/303 434/262 |
| 9,020,217 B2 * | 4/2015 | Amyot | G06T 19/00 382/128 |
| 9,386,960 B2 | 7/2016 | Tavakoli et al. | |

(Continued)

FOREIGN PATENT DOCUMENTS

CN 109620227 B 11/2019

OTHER PUBLICATIONS

Cygan, Szymon, et al. "Left ventricle phantom and experimental setup for MRI and echocardiography—Preliminary results of data acquisitions." Biocybernetics and Biomedical Engineering 34.1 (2014): 19-24.

(Continued)

*Primary Examiner* — Kurt Fernstrom
(74) *Attorney, Agent, or Firm* — Nath, Goldberg & Meyer; Joshua B. Goldberg

(57) ABSTRACT

The left ventricle imaging phantom includes a housing, a syringe, a balloon and a reservoir for receiving a liquid. The syringe has a barrel and a plunger, with the barrel having a fluid port. The balloon is in fluid communication with the fluid port of the barrel. The reservoir is in fluid communication with the balloon and the fluid port of the barrel of the syringe. The plunger is selectively and controllably moved within the barrel of the syringe. The balloon is selectively and controllably compressed and decompressed in a manner which is synchronized with the movement of the plunger within the barrel in order to selectively drive the liquid in and out of the balloon. A controller controls the movement of the plunger within the barrel of the syringe and the compression and decompression of the balloon to simulate functioning of a left ventricle of a human heart.

5 Claims, 1 Drawing Sheet

(56) References Cited

U.S. PATENT DOCUMENTS

| | | | | |
|---|---|---|---|---|
| 9,965,976 B2* | 5/2018 | Tanabe | ............... | G09B 23/288 |
| 10,937,337 B2* | 3/2021 | Okayama | ............... | G09B 23/34 |
| 2003/0045803 A1* | 3/2003 | Acharya | ............... | A61B 6/583 |
| | | | | 600/508 |
| 2017/0103682 A1* | 4/2017 | Okayama | ............. | G06T 7/0012 |
| 2018/0108276 A1* | 4/2018 | Ishiyama | ............ | G09B 23/303 |
| 2020/0135057 A1* | 4/2020 | Fatimi | ................ | G09B 23/303 |

OTHER PUBLICATIONS

Gomes-Fonseca, João, et al. "Personalized dynamic phantom of the right and left ventricles based on patient-specific anatomy for echocardiography studies—Preliminary results." 2018 IEEE 6th International Conference on Serious Games and Applications for Health (SeGAH). IEEE, 2018.

Christierson, Lea, et al. "Multi-modal Phantom Experiments, mimicking Flow through the Mitral Heart Valve." bioRxiv (2024): 2024-02.

\* cited by examiner

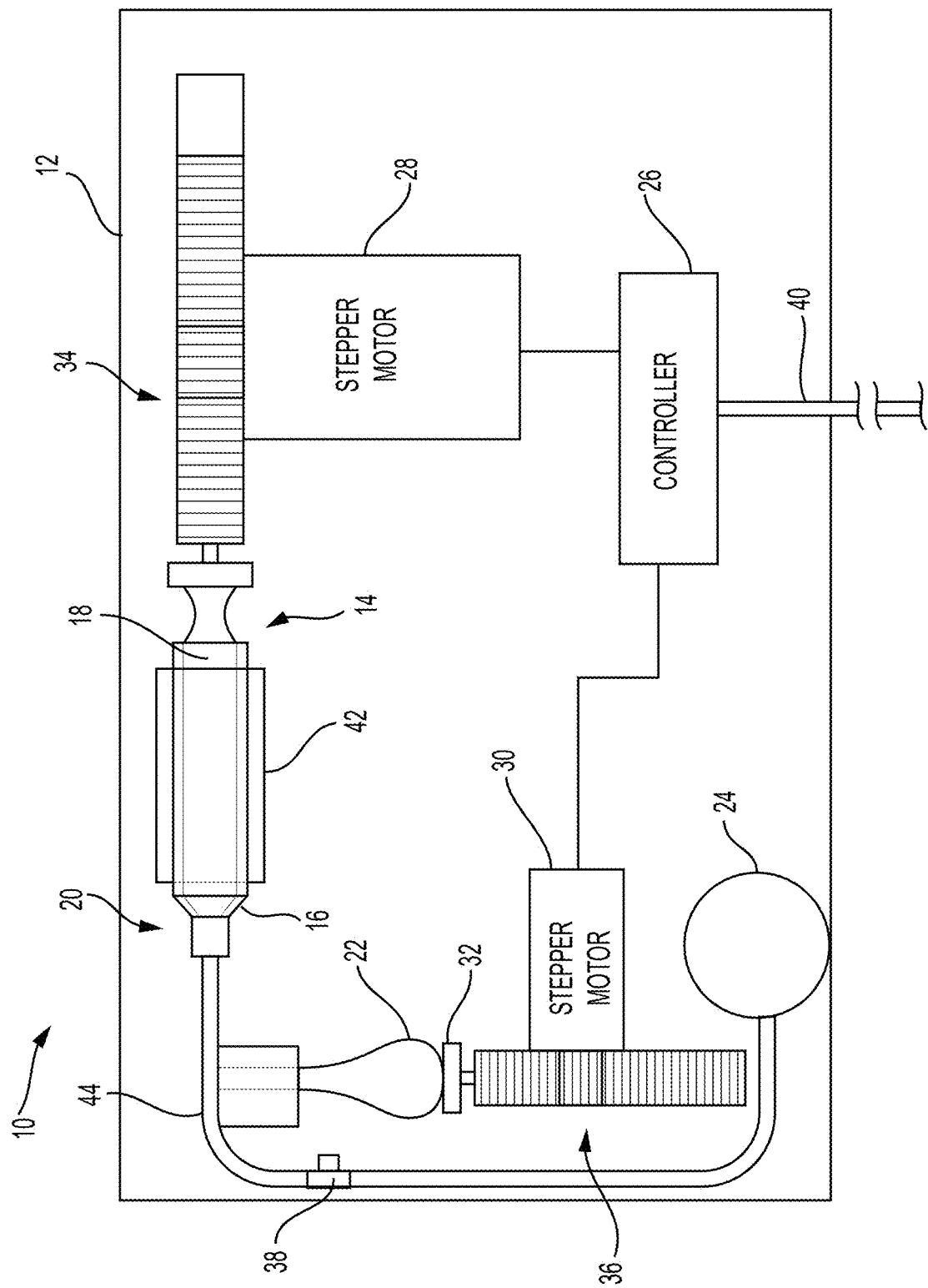

LEFT VENTRICLE IMAGING PHANTOM

BACKGROUND

Field

The disclosure of the present patent application relates to medical imaging phantoms, and particularly to an imaging phantom which simulates the left ventricle of the human heart.

Description of Related Art

In medical imaging, a "phantom" (sometimes referred to as an "imaging phantom") is a specially designed object that is scanned or imaged to evaluate, analyze and tune the performance of various imaging devices. These objects are used as stand-ins for human tissues to ensure that imaging systems are operating correctly. A phantom is more readily available and provides more consistent results than the use of a living subject or cadaver, and likewise avoids subjecting a living subject to direct risk. For example, the Jaszczak phantom (also referred to as the "data spectrum ECT phantom") is an imaging phantom used for validating scanner geometry, three-dimensional (3D) contrast, uniformity, resolution, attenuation and scatter correction or alignment tasks in nuclear medicine. The Jaszczak phantom is commonly used in academic centers and hospitals to characterize single-photon emission computed tomography (SPECT), or some gamma camera systems for quality control purposes. Jaszczak phantoms consist of a main cylinder or tank made of acrylic plastic with several inserts. The Jaszczak phantoms have six solid spheres and six sets of "cold" rods. In flanged models, the sizes of the spheres vary. The number of rods in each set depends on the size of the rod in that set, as different models of the phantom have rods of different sizes. In flangeless models, the diameters of the spheres are 9.5, 12.7, 15.9, 19.1, 25.4 and 31.8 mm, while the rod diameters are 4.8, 6.4, 7.9, 9.5, 11.1 and 12.7 mm. Both solid spheres and rod inserts mimic cold lesions in a hot background. The spheres are used to measure the image contrast while the rods are used to investigate the image resolution in SPECT systems.

As another example, "CT phantoms" are used for testing and analyzing computed tomography (CT) scanning systems. Such CT phantoms may be used, for example, to assess image quality parameters, such as spatial resolution, low-contrast detectability and geometric accuracy. For cardiac imaging, as another example, a specialized phantom, which may be integrated into a standard CT phantom, may be used to simulate the coronary arteries and cardiac motion. This allows for the evaluation of CT angiography protocols and the optimization of imaging techniques to reduce motion artifacts and improve the visualization of coronary vessels.

As a further example, "MRI phantoms" are commonly used with magnetic resonance imaging (MRI) systems for ensuring the accurate representation of human tissues in MRI. MRI phantoms may be used, for example, to assess image uniformity, geometric distortion and signal-to-noise ratio in MRI systems. For cardiac applications, a specialized cardiac phantom may be used, which simulates heart motion and enables the testing of cardiac MRI protocols, including functional imaging and myocardial perfusion studies. Such phantoms allow for the evaluation of cine MRI sequences and the optimization of techniques to capture the rapid motion of the heart accurately. Specialized MRI phantoms may also be used for testing the performance of MRI scanners, particularly in terms of gradient linearity and signal stability, which are crucial for high-quality cardiac imaging.

Although phantoms of the types described above are successfully used as stand-ins for various types of tissues, they are typically static objects; i.e., they are not useful for simulating the dynamic conditions which exist in living human beings. For example, the static phantoms discussed above cannot adequately be used to simulate the dynamics of the left ventricle (LV) compartment of the human heart. Since medical imaging is typically performed on living people, being able to test and analyze the imaging systems with dynamic stand-ins, rather than static stand-ins, is necessary for making truly accurate evaluations. Thus, a left ventricle imaging phantom solving the aforementioned problems is desired.

SUMMARY

The left ventricle imaging phantom mimics the dynamic behavior of the left ventricle (LV) of the human heart, synchronized with corresponding electrocardiographic (ECG) signals in order to facilitate gated imaging. This enables precise monitoring of cardiac function and allows for rigorous quality control testing in various imaging techniques, such as, for example, computed tomography (CT), positron emission tomography (PET), and single-photon emission computed tomography (SPECT). The left ventricle imaging phantom includes a housing, a syringe, a balloon and a reservoir for receiving a liquid. The syringe has a barrel and a plunger, with the barrel being fixed within the housing and having a fluid port. The balloon is in fluid communication with the fluid port of the barrel of the syringe, and is mounted within the housing. The reservoir is in fluid communication with the balloon and the fluid port of the barrel of the syringe. The reservoir is also mounted within the housing. The plunger is selectively and controllably moved within the barrel of the syringe. The balloon is selectively and controllably compressed and decompressed in a manner which is synchronized with the movement of the plunger within the barrel in order to selectively drive the liquid in and out of the balloon.

A controller is provided for controlling the movement of the plunger within the barrel of the syringe and for controlling the compression and decompression of the balloon for the synchronized selective driving of the liquid in and out of the balloon to simulate functioning of a left ventricle of a human heart. The controller may be programmed to generate and synchronize three-axis electrocardiographic (ECG) signals which replicate ECG signals corresponding to real human heart activity. These signals may be used for gated imaging, allowing the left ventricle imaging phantom to simulate different phases of the cardiac cycle with high precision.

These and other features of the present subject matter will become readily apparent upon further review of the following specification.

BRIEF DESCRIPTION OF DRAWINGS

The sole drawing FIGURE diagrammatically illustrates a left ventricle imaging phantom.

DETAILED DESCRIPTION

The left ventricle imaging phantom 10 mimics the dynamic behavior of the left ventricle (LV) of the human heart, synchronized with corresponding electrocardiographic (ECG) signals in order to facilitate gated imaging. This enables precise monitoring of cardiac function and allows for rigorous quality control testing in various imaging techniques, such as, for example, computed tomography (CT), positron emission tomography (PET), and single-photon emission computed tomography (SPECT). The left ventricle imaging phantom 10 includes a housing 12, a syringe 14, a balloon 22 and a reservoir 24 for receiving a liquid. The syringe 14 has a barrel 16 and a plunger 18, with the barrel 16 being fixed within the housing 12 and having a fluid port 20. The balloon 22 is in fluid communication with the fluid port 20 of the barrel 16 of the syringe 14, and is mounted within the housing 12. It should be understood that syringe 14 is shown for exemplary purposes only and that any suitable type of syringe or similar structure for expelling and extracting fluid may be used. Further, it should be understood that the size, shape and relative dimensions of reservoir 24 are shown for exemplary purposes only, and that the liquid may be stored within any suitable type of reservoir or container. Further, it should be understood that any suitable type of liquid capable of simulating human blood flowing into and out of the left ventricle of the human heart may be used.

The reservoir 24 is in fluid communication with the balloon 22 and the fluid port 20 of the barrel 16 of the syringe 14. The reservoir 24 is also mounted within the housing 12. The plunger 18 is selectively and controllably moved within the barrel 16 of the syringe 14. The balloon 22 is selectively and controllably compressed and decompressed in a manner which is synchronized with the movement of the plunger 18 within the barrel 16 in order to selectively drive the liquid in and out of the balloon 22. It should be understood that the shape, size and relative dimensions of the balloon 22 are shown for exemplary purposes only.

A controller 26 is provided for controlling the movement of the plunger 18 within the barrel 16 of the syringe 14 and for controlling the compression and decompression of the balloon 22 for the synchronized selective driving of the liquid in and out of the balloon 22 to simulate functioning of a left ventricle of a human heart. The controller 26 may be provided with any necessary connections, such as cord 40 or the like, for connection to an external power supply, external control equipment, a user interface, etc.

It should be understood that the shape and relative dimensions of the housing 12 are shown in the sole drawing FIGURE for exemplary purposes only. It should be further understood that the housing 12 may be made from any suitable materials for protecting and isolating the internal components of the left ventricle imaging phantom 10 from the external environment, particularly for safeguarding the internal components against electrical contact and radiation leaks. Additionally, although a syringe base 42 is shown for mounting and stabilizing the syringe 14 within the housing 12, it should be understood that syringe base 42 is shown in the sole drawing FIGURE for exemplary purposes only and that any suitable type of mount, bracket or the like may be used to secure the syringe 14 within the housing 12.

It should be further understood that the plunger 18 of syringe 14 may be selectively and controllably driven to move within the barrel 16 using any suitable type of drive system. As a non-limiting example, as shown in the sole drawing FIGURE, a first stepper motor 28 may be mounted within housing 12 and may be used to selectively move the plunger 18 within the barrel 16 of the syringe 14. It should be further understood that the first stepper motor 28 may be coupled to the plunger 18 using any suitable type of linkage or coupling. As shown in the non-limiting example of the sole drawing FIGURE, a first rack and pinion 34 may mechanically couple the first stepper motor 28 to the plunger 18.

It should be similarly understood that the balloon 22 may be selectively and controllably compressed and decompressed using any suitable type of actuator or drive system for simulating ventricular contraction and relaxation. As a non-limiting example, as shown in the sole drawing FIGURE, a second stepper motor 30 may be mounted within housing 12 and may be used to selectively compress and decompress the balloon 22. As shown, a pusher plate 32 may contact the balloon 22 and may be coupled to the second stepper motor 30. It should be understood that the second stepper motor 30 may be coupled to the pusher plate 32 using any suitable type of linkage or coupling. As shown in the non-limiting example of the sole drawing FIGURE, a second rack and pinion 36 may mechanically couple the second stepper motor 30 to the pusher plate 32.

The first stepper motor 28 supplies the necessary mechanical force to move the plunger 18 of the syringe 14, pushing the liquid into the balloon. Simultaneously, the second stepper motor 30 drives the pusher plate 32, facilitating the expulsion and retraction of liquid in the balloon 22 in order to simulate the left ventricle's pulsatile motion. The first stepper motor 28 may be secured within the housing 12 using any suitable type of bracket or mount. Similarly, the second stepper motor 30 may also be secured within the housing 12 using any suitable type of bracket or mount.

As shown in the sole drawing FIGURE, the syringe 14, reservoir 24 and balloon 22 are in fluid communication with one another through a tube or conduit 44. It should be understood that any suitable type of tube or conduit may be used. An additional fluid valve 38 may be fitted in the tube or conduit 44 to regulate flow of the liquid from the reservoir 24 in order to precisely manage the liquid flow during simulation experiments. It should be understood that any suitable type of fluid control valve 38 may be used.

As discussed above, the controller 26 is in communication with both the first stepper motor 28 and the second stepper motor 30 to selectively control the movement of the plunger 18 within the barrel 16 of the syringe 14 and to selectively control the compression and decompression of the balloon 22 for the synchronized selective driving of the liquid in and out of the balloon 22 to simulate functioning of the left ventricle. It should be understood that the controller 26 may be any suitable type of controller, such as, as non-limiting examples, a processor, a programmable logic controller, a computer or the like. It should be further understood that the controller 26 may include any necessary computer readable memory, user interfaces or the like, or may be in communication therewith. Controller 26 may be programmed to generate and synchronize three-axis electrocardiographic (ECG) signals which replicate ECG signals corresponding to real human heart activity. These signals may be used for gated imaging, allowing the left ventricle imaging phantom 10 to simulate different phases of the cardiac cycle with high precision.

It is to be understood that the left ventricle imaging phantom is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A left ventricle imaging phantom, comprising:

a housing;

a syringe having a barrel and a plunger, the barrel being fixed within the housing and having a fluid port;

a balloon in fluid communication with the fluid port of the barrel of the syringe, the balloon being mounted within the housing;

a reservoir for receiving a liquid, the reservoir being in fluid communication with the balloon and the fluid port of the barrel of the syringe, the reservoir being mounted within the housing;

means for selectively moving the plunger within the barrel of the syringe;

means for selectively compressing and decompressing the balloon synchronized with the means for selectively moving the plunger within the barrel of the syringe for selectively driving the liquid in and out of the balloon; and a controller configured for actuating the means for selectively moving the plunger within the barrel of the syringe and the means for selectively compressing and decompressing the balloon for the synchronized selective driving of the liquid in and out of the balloon to simulate functioning of a left ventricle of a human heart.

2. The left ventricle imaging phantom as recited in claim 1, wherein said means for selectively moving the plunger within the barrel of the syringe comprises a first stepper motor coupled to the plunger, the first stepper motor being mounted within the housing.

3. The left ventricle imaging phantom as recited in claim 2, wherein said means for selectively moving the plunger within the barrel of the syringe further comprises a first rack and pinion driven by the first stepper motor and coupled to the plunger.

4. The left ventricle imaging phantom as recited in claim 3, wherein said means for selectively compressing and decompressing the balloon comprises a second stepper motor coupled to a pusher plate, the pusher plate being configured for contacting the balloon, and the second stepper motor being mounted within the housing.

5. The left ventricle imaging phantom as recited in claim 4, wherein selectively compressing and decompressing the balloon further comprises a second rack and pinion driven by the second stepper motor and coupled to the pusher plate.

* * * * *